(12) United States Patent
Myers

(10) Patent No.: US 6,707,006 B1
(45) Date of Patent: Mar. 16, 2004

(54) HEATED STEERING WHEEL AND METHOD OF MAKING SAME

(75) Inventor: Donald G. Myers, Forest Hills, MD (US)

(73) Assignee: Old Line Plastics, Inc., Forest Hill, MD (US)

(*) Notice: Subject to any disclaimer, the term of this patent is extended or adjusted under 35 U.S.C. 154(b) by 0 days.

(21) Appl. No.: 10/408,654

(22) Filed: Apr. 4, 2003

(51) Int. Cl.[7] .................................................. H05B 3/18
(52) U.S. Cl. ........................ 219/204; 219/543; 219/544; 29/894.1
(58) Field of Search ................................ 219/204, 543, 219/544; 29/894.1, 611; 74/552, 558

(56) References Cited

U.S. PATENT DOCUMENTS

| | | | | |
|---|---|---|---|---|
| 2,835,777 A | * | 5/1958 | Gates et al. ................ | 219/204 |
| 4,547,655 A | * | 10/1985 | Kurata et al. ................ | 219/204 |
| 2001/0003336 A1 | * | 6/2001 | Abbott et al. ................ | 219/543 |
| 2002/0096512 A1 | * | 7/2002 | Abbott et al. ................ | 219/543 |
| 2003/0111453 A1 | * | 6/2003 | Haag et al. .................. | 219/204 |

FOREIGN PATENT DOCUMENTS

DE  29712839  * 9/1997

* cited by examiner

Primary Examiner—John A. Jeffery
(74) Attorney, Agent, or Firm—Armstrong, Kratz, Quintos, Hanson & Brooks, LLP

(57) ABSTRACT

A method for forming a heated steering wheel includes a member formed from a sheet of plastic having an attached electrically conductive pattern. The film is formed into a desired configuration. Electrical leads are connected to the pattern. A plastic resin is applied to encapsulate the conductive pattern and to strengthen the film. The member is connected to the steering wheel core.

7 Claims, 6 Drawing Sheets

HEATED STEERING WHEEL AND METHOD OF MAKING SAME

BACKGROUND OF THE INVENTION

1. Field of the Invention

The present invention relates to a steering wheel for a vehicle and more particularly to a steering wheel which can be heated and can be made comparatively inexpensively.

2. Description of Related Art

In cold weather, the steering wheel of a vehicle feels very cold to the hands of the operator and a heated steering wheel greatly improves the comfort of the operator which contributes to the safe operation of the vehicle.

This problem has been reorganized and U.S. Pat. No. 4,547,655 to Kurata et al is directed to an electrically heated steering wheel. The object of the patent is to obtain uniform warming in a relatively short time and to avoid a zone of high temperature at the terminals. A metal vaporization technique is used to deposit a metal film on the rim. An electrically insulating sheet covers the metal film and an electric heat generating member covers the insulating sheet. An outermost electrically insulting cover made of woven fabric is in contact with the hands of the vehicle operator.

In U.S. Pat. No. 6,365,875 to Kreuzer et al, heating wires are disposed on a wheel rim and are covered by a casing. The casing is a support layer having good thermal conductivity which is covered with a veneer wood.

Zhao et al in U.S. Pat. No. 6,392,195 disclose a woven fabric made from nylon coated with silver. A foam layer covers the heating element and a leather wrap or wood shell encases the foam.

In U.S. Pat. No. 6,441,344 to Bonn et al, a layer of electrically conducting plastic surrounds the core of the rim. A pair of electrodes extend the length of the conductive layer. An outer casing is made of leather, wood or film.

All of the known heated steering wheels are costly to prepare and, as a result, heated steering wheels are presently available only in the more luxurious upgraded vehicles.

This is a need for a heated steering wheel which can be made relatively in expensively so the option of a heated steering wheel can be made available to mid or low end vehicles regardless of the make or model.

SUMMARY OF THE INVENTION

It is an object of the present invention to provide a method of making a heated steering wheel at relatively low cost so the heated steering wheel can be available in mid to low end vehicles.

It is a further object of the present invention to provide a steering wheel which can be heated in cold weather to improve the comfort of the operator and improve safety of operating the vehicle.

In accordance with the teachings of the present invention, there is disclosed a method of forming a heated steering wheel for a vehicle. A sheet of moldable plastic is provided. The sheet has a first face and an opposite second face. A pattern is silk screened on the second face of the sheet using an electrically conductive ink. The pattern has two opposite ends. The sheet is vacuum formed into a desired shape. Two electrical leads are provided. Each lead is electrically connected to a different one of the ends of the silk screen pattern. A plastic resin is molded adjacent to the second face of the plastic sheet wherein the silk screen pattern and the electrical leads are encapsulated and the formed plastic sheet is reinforced. The reinforced plastic sheet is attached to the steering wheel with the silk screen pattern oriented toward the steering wheel.

In further accordance with the teachings of the present invention, there is disclosed a heated steering wheel having a center core. A molded sheet of plastic has a first outer face and a second inner face. A pattern of electrically conductive ink is formed on the second inner face. A pair of electrical leads are connected to the pattern of electrical conductive ink. A molded plastic resin is formed in the inner second face, the molded plastic resin encapsulating the pattern of electrically conductive ink and the pair of electric leads. The molded plastic resin is connected to the center core.

These and other objects of the present invention will become apparent from a reading of the following specification taken in conjunction with the enclosed drawings.

DESCRIPTION OF PREFERRED EMBODIMENTS

Figure 1:
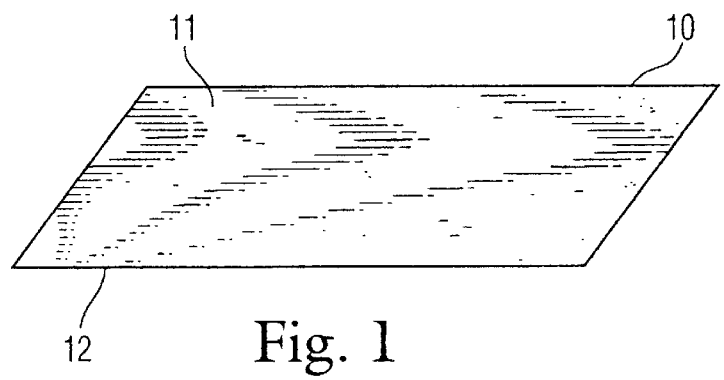
FIG. 1 is a perspective view of a sheet of plastic film.

A substrate such as a sheet of moldable plastic 10 in the form of a film is obtained from a vendor. The film may be selected from different types of plastic and ABS has been found to perform satisfactorily. Preferably, a design such as an imitation wood grain or simulated leather, is formed on the first outer face 11 of the film (FIG. 1). If desired, the outer face 11 may have a selected color. The choice of design or color is made based on the aesthetic effect to be given to the steering wheel which is to be used in a vehicle.

Figure 2:
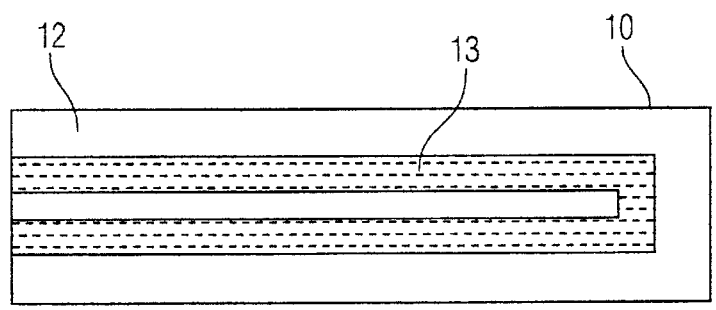
FIG. 2 is a perspective view showing a silk screen pattern formed on the inner face of the sheet of plastic.

An electrically conductive ink is deposited in a selected heater pattern on the inner face 12 of the substrate 10. Preferably the deposition is by a silk screen process. The heater pattern 13 is continuous having two opposite ends. It is preferred that the pattern 13 double back on itself so the two ends of the heater patterns are adjacent to one another on the substrate (FIG. 2). The film 10 with the pattern is placed in an oven to dry. After drying, the film 10 is trimmed to a desired size.

Figure 3:
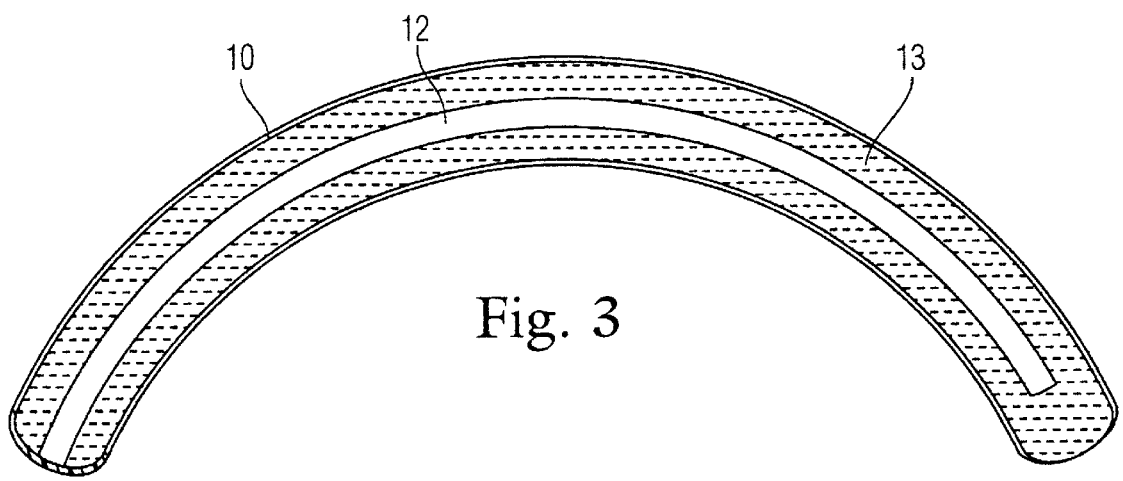
FIG. 3 is a perspective view of the inner face of the sheet of plastic formed as an arc of a half round strip.

The trimmed film 10, on which the pattern 13 is deposited, is heated until it softens and begins to sag. The film 10 is placed on a vacuum forming mold (either male or female) and vacuum is applied. The film is formed on a half-round strip in an arcuate shape. The pattern 13 is on the interior of the half-round strip (FIG. 3). The arc preferably is approximately 180° although larger or shorter arcs may be formed. If required, air pressure may be used to aid the forming. The formed part is removed from the vacuum forming device and is further trimmed to a final size.

Electrical leads 18 are connected to the ends of the heater pattern 13. The electrical leads 18 may be in the form of wires or contacts and may be connected to the heater pattern 13 by means known to persons skilled in the art.

Figure 4:
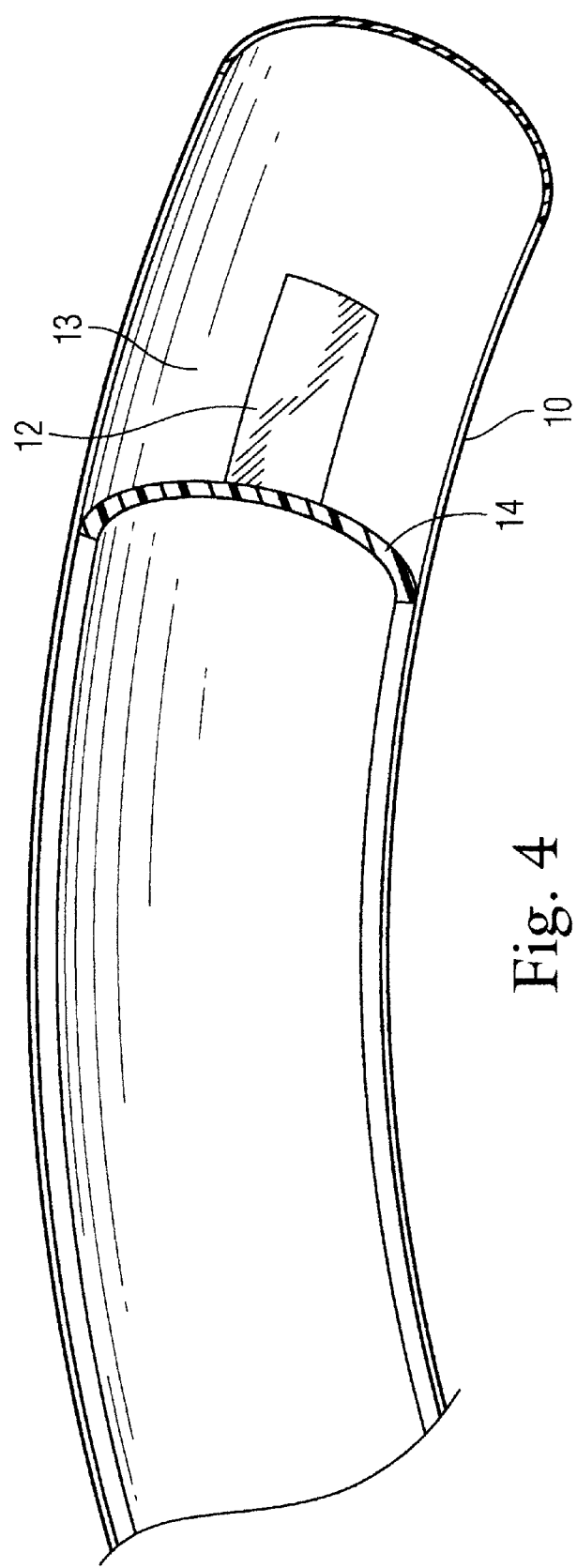
FIG. 4 is a partial cut away perspective view of the inner face of the arc which has a plastic resin formed thereon.

The formed part is placed in an injection mold, taking care to protect the electrical leads 18 from damage. A plastic resin 14 is injected adjacent to the heater pattern 13 on inner face 12 of the formed part. The plastic resin 14 encapsulates the heater pattern 13 and the electrical leads 18. The plastic resin 14 reinforces the part and provides increased mechanical strength to the part (FIG. 4). After the plastic resin 14 has set up, the part is removed from the injection mold.

Figure 5:
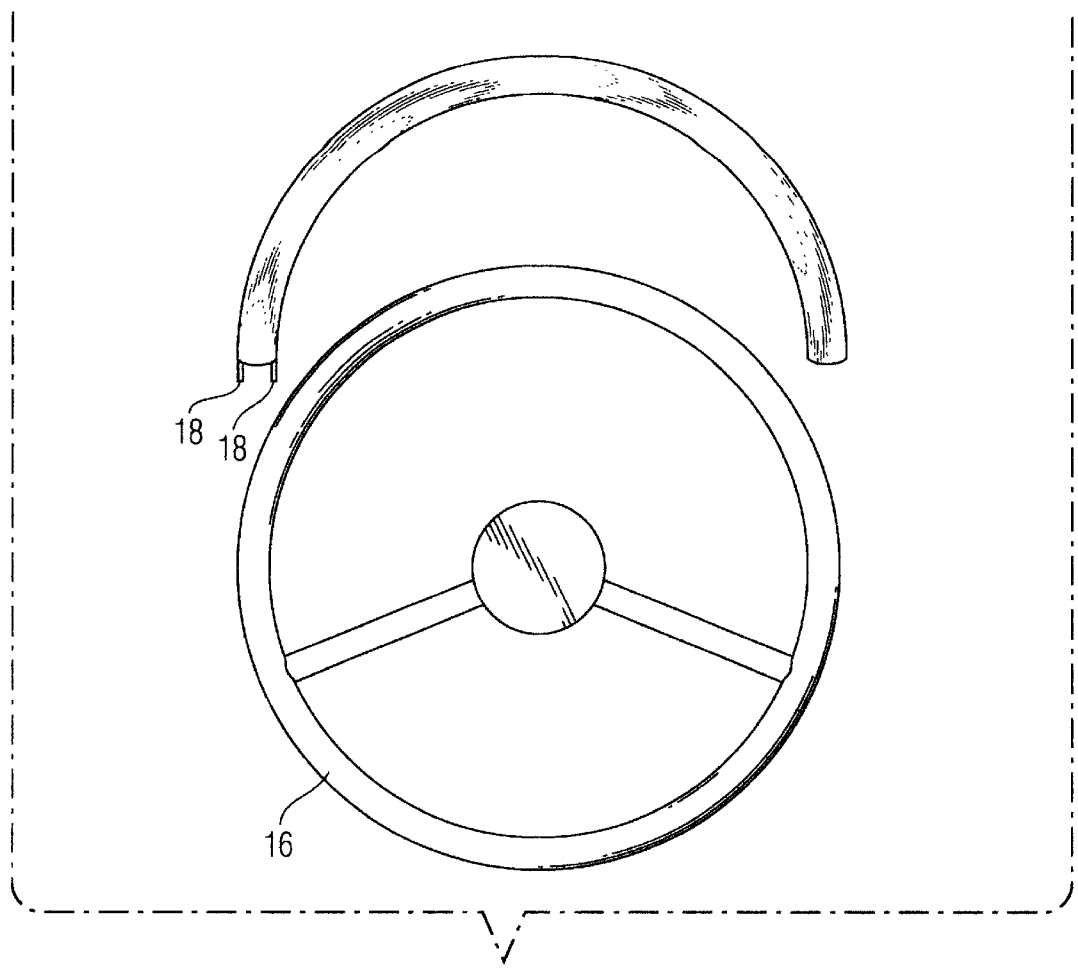
FIG. 5 is an exploded view of the reinforced arc of the plastic sheet being disposed on the core of the steering wheel.
Figure 6:
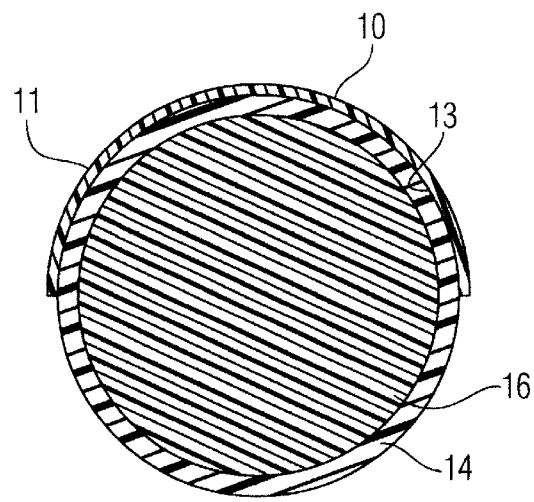
FIG. 6 is a cross-sectional view taken across the steering wheel core to which the reinforced arc of plastic sheet has been attached.

The formed part is now connected to the steering wheel core 16 with the electrical leads 18 being electrically connected to a source of electric power (FIGS. 5, 6).

Figure 7:
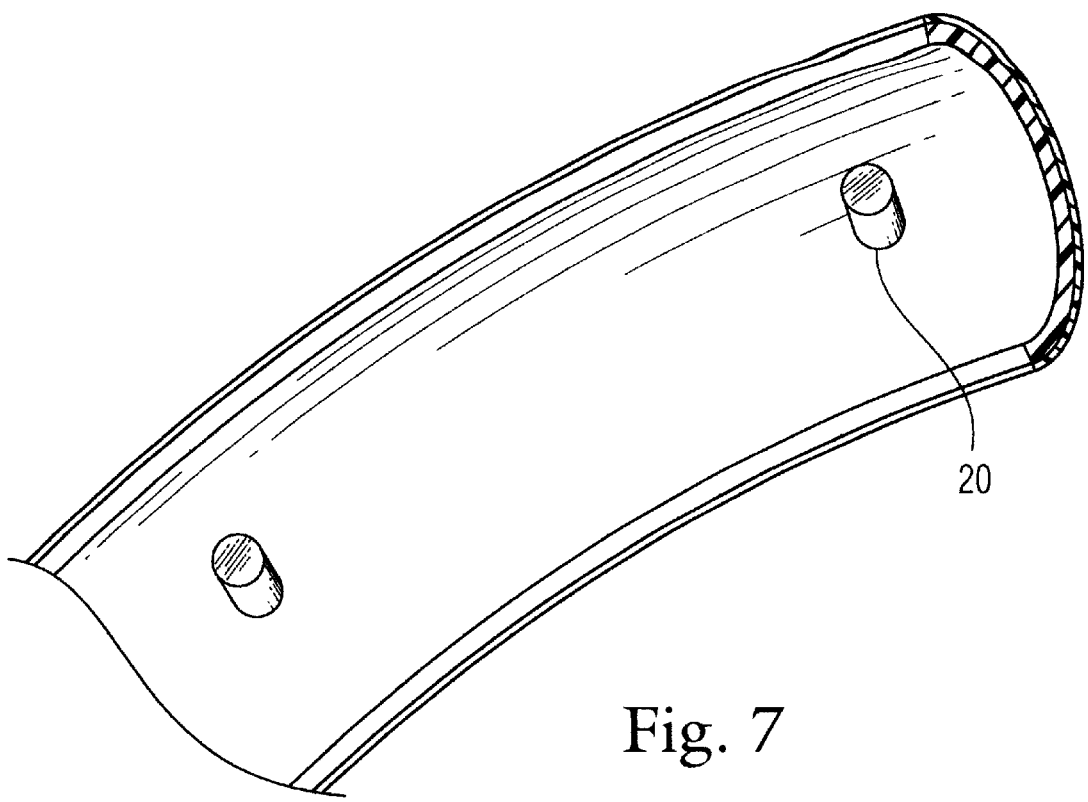
FIG. 7 is an enlarged perspective view of connecting means formed on the plastic resin.
Figure 8:
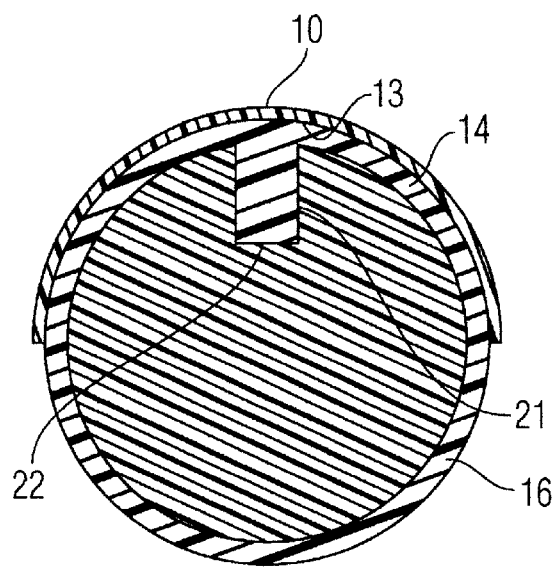
FIG. 8 is a cross-sectional view showing the connecting means of FIG. 7 cooperating with receiving means in the core of the steering wheel.
Figure 9:
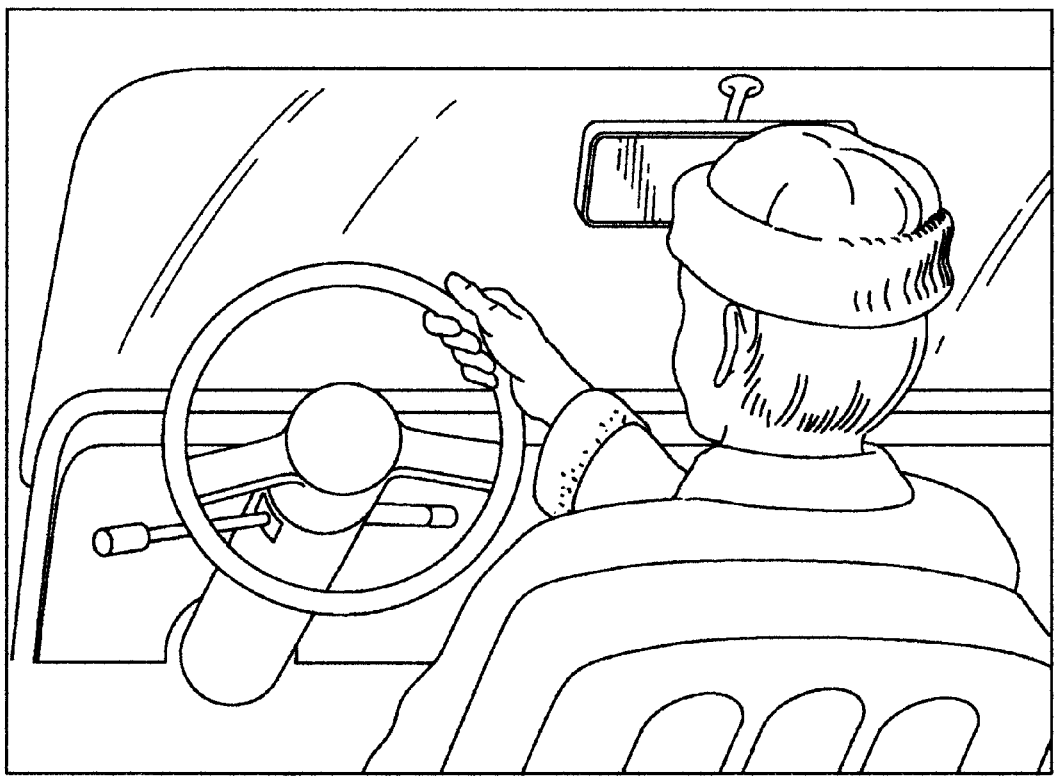
FIG. 9 is a perspective view of a driver in a vehicle having the heated steering wheel of the present invention.
Figure 10:
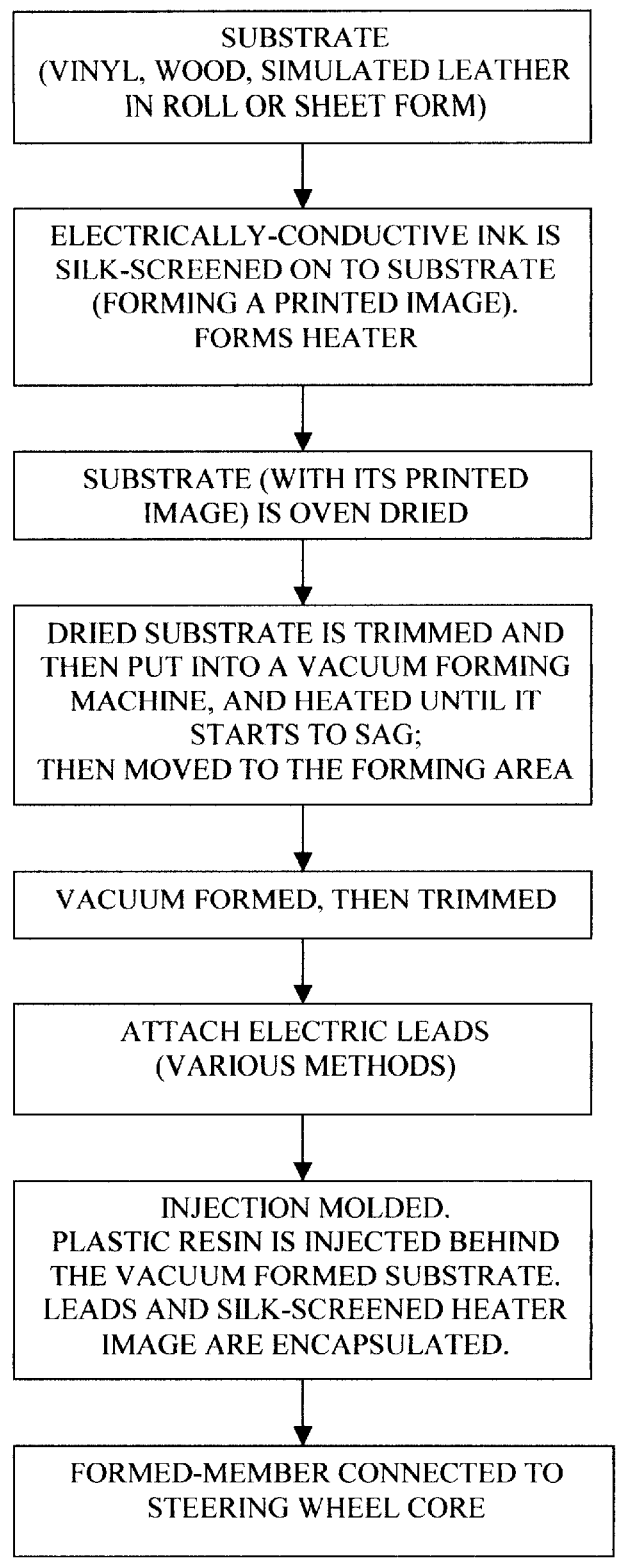
FIG. 10 is a diagram of the method of making the heated steering wheel.

The formed part may be connected to the steering wheel core by use of adhesives, heat or mechanical connectors. An example of a mechanical connector means is shown in FIGS. 7 and 8. A plurality of spaced apart connecting means 20 are formed in the plastic resin 14 oriented inwardly from the plastic film. The connecting means 20 may be a barb, split fingers or friction fitting connectors. Cooperating receiving means 22 are formed in the steering wheel core 16 to engage the connecting means 20. Alternately, the connecting means may be formed extending outwardly from the steering wheel core and the cooperating receiving means may be formed in the plastic resin.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A method of forming a heated steering wheel for a vehicle comprising the steps of providing a sheet of moldable plastic, the sheet being a film having a first face and an opposite second face;

silk screening a pattern on the second face of the sheet using an electrically conductive ink, the pattern having two opposite ends;

vacuum forming the sheet into a desired shape;

providing two electrical leads and electrically connecting each lead to a different one of the ends of the silk screened pattern;

molding a plastic resin adjacent to the second face of the sheet wherein the silk screen pattern and the electrical leads are encapsulated and the formed plastic sheet is reinforced; and attaching the reinforced plastic sheet to the steering wheel with the silk screened pattern oriented toward the steering wheel.

2. The method of claim 1, wherein a desired pattern is formed on the first face of the sheet.

3. The method of claim 1, wherein the desired shape of the vacuum formed sheet is an arc.

4. The method of claim 3, wherein the arc is 180°.

5. The method of claim 1, wherein the sheet is trimmed after being vacuum formed to remove excess.

6. The method of claim 1 further comprising forming a plurality of connecting means on the plastic resin, the connecting means cooperating with a plurality of receiving means formed in the steering wheel, such that the plastic resin, the silk screen pattern and the desired shape of the sheet are connected to the steering wheel.

7. A heated steering wheel made by the process of claim 1.

* * * * *